(12) United States Patent
Frosini et al.

(10) Patent No.: US 6,893,209 B2
(45) Date of Patent: May 17, 2005

US006893209B2

(54) CONNECTING SYSTEM FOR A TRANSITION DUCT IN A GAS TURBINE

(75) Inventors: Franco Frosini, Florence (IT); Luciano Mei, Florence (IT)

(73) Assignee: Nuovo Pignone Holding S.p.A., Florence (IT)

(*) Notice: Subject to any disclaimer, the term of this patent is extended or adjusted under 35 U.S.C. 154(b) by 0 days.

(21) Appl. No.: 10/312,842

(22) PCT Filed: Jun. 28, 2001

(86) PCT No.: PCT/EP01/07413
§ 371 (c)(1),
(2), (4) Date: Aug. 25, 2003

(87) PCT Pub. No.: WO02/02911
PCT Pub. Date: Jan. 10, 2002

(65) Prior Publication Data
US 2004/0037699 A1 Feb. 26, 2004

(30) Foreign Application Priority Data
Jul. 3, 2000 (IT) .................................... MI2000A1492

(51) Int. Cl.⁷ .............................................. F01D 5/14
(52) U.S. Cl. ..................... 415/115; 415/214; 415/97 R; 60/39.32
(58) Field of Search ......................... 415/214, 115–116, 415/97 R, 144, 139; 60/39.32, 752, 760, 757

(56) References Cited

U.S. PATENT DOCUMENTS

| 4,191,011 A | 3/1980 | Sweeney et al. |
| 4,901,522 A | 2/1990 | Commaret et al. |
| 6,139,263 A | * 10/2000 | Klingels ................. 415/173.5 |

FOREIGN PATENT DOCUMENTS

| GB | 369680 A | 3/1932 |
| GB | 689270 A | 3/1953 |

* cited by examiner

Primary Examiner—Edward K. Look
Assistant Examiner—James M. McAleenan
(74) Attorney, Agent, or Firm—Nixon & Vanderhye

(57) ABSTRACT

A system for connecting a low-pressure jet to a transition duct in a gas turbine, in which the said low-pressure jets are arranged in sectors of two or three stator blades and are filled on to the ring of the jets. The platforms of the jets are provided with a channel inside which the transition duct is positioned by means of an edge. Furthermore, centering between the transition duct and the ring of the jets is achieved directly using centering means at three or more points.

12 Claims, 2 Drawing Sheets

CONNECTING SYSTEM FOR A TRANSITION DUCT IN A GAS TURBINE

The present application is a U.S. National Phase (371 application) of PCT/EP01/07413.

BACKGROUND OF THE INVENTION

The present invention relates to a system for connecting a low-pressure jet to a transition duct which form part of a gas turbine.

Furthermore the present invention relates to a low-pressure jet which forms part of a gas turbine.

Gas turbines are known to comprise a compressor to which ambient air is fed and then pressurised.

The pressurised air passes through a series of combustion chambers terminating in a jet in each of which an injector supplies fuel which mixes with the air to form an air-fuel mix for combustion.

The combustion gases are then sent towards the turbine which transforms the enthalpy of the gases which have been combusted in the combustion chamber into mechanical energy available to a user.

Twin-shaft gas turbines have a gas generator and a power turbine with independent shafts which rotate at different speeds.

The power rotor is made up of a shaft which at one end supports the low-pressure turbine discs and the bearing flange at the other end.

The hot gases generated in the gas generator have to be converted to power available to a user by a low-pressure turbine.

The low-pressure jets accelerate and direct the hot gases towards the rotor blades, transferring the useful power to the turbine shaft.

In order to keep the housing of a gas turbine as cool as possible, the stator jets over which the hot gases pass are not fixed directly to the stator housing but instead are arranged in sectors, each sector being made up of two or three jets, and, are insulated from the stator housing by means of dividers made of low heat conductivity material.

It should be noted here that the transition duct is the connecting component between the high-pressure blades and the low-pressure jets.

In particular, the transition duct generally consists of two concentric cylinders whose middle section may have a different shape so as to allow the desired flow of hot gases.

The hot gases have to flow in a way that minimises mechanical and heat losses. The hot gases are at very high temperatures and, therefore, the walls of the transition duct must be able to withstand these conditions and maintain their structural integrity.

Furthermore, the sealing between the transition duct and the low-pressure jets is an important variable for ensuring the performance of the motor and for maintaining the integrity of the outer housing of the gas turbine.

In order to promote understanding, of the technical problems to be solved by the invention, reference should now be made to the following state of the prior art.

Transition ducts of existing turbines may be divided into two categories: high-thickness transition ducts (which are divided into segments) and low-thickness transition ducts (which are parts at 360°).

In both solutions, the housings and the low-pressure jets can easily support the external walls.

The main problem to be solved is that of correctly supporting the internal wall which generally faces the rear of the high-pressure rotor.

Therefore, the internal wall may only be supported by an external wall using structural struts or connecting arms or protuberances which extend from the platform of the low-pressure jets.

The first solution is particularly advantageous if the axial length of the transition duct is considerable, as the internal wall cannot be easily supported at one end only.

However, the struts or connecting arms can cause mechanical losses and are not of simple design, precisely because of the high temperatures of the gases which flow through the transition ducts.

These high temperatures can cause incidents of "heat fatigue" which can cause various components to break and therefore significantly limit their useful life and their resistance to heat fatigue.

In any case the axial length of the transition duct can only be minimised by extending the axial length of the platform of the low-pressure jets so that the transition duct is included in the extended platforms of the low-pressure jets in some applications.

This solution is shown in FIG. 1 as an example of an embodiment of the prior art.

In particular FIG. 1 shows an assembly indicated generally by reference numeral 20, comprising a transition duct 21 connected to the extended platform 22 of the low-pressure jets 23. A connecting arm 24 is also shown.

The segmented internal walls can also be supported by an internal structure that is protected from hot gases, and are subject to weight loads and pressure differentials.

In the prior art, segmented transition ducts are commonly used for high-performance motors with horizontally separated housings alongside the (thin-walled) 360° transition ducts which are common in aeronautical turbines.

BRIEF SUMMARY OF THE INVENTION

The object of the invention is therefore to provide a system for connecting a low-pressure jet to a transition duct in a gas turbine which makes it possible to prevent heat transmission to the outer housing through the centring system itself.

Another object of the invention is to provide a system for connecting a low-pressure jet to a transition duct in a gas turbine which avoids the use of struts or connecting arms for its support and centring.

A further object of the invention is to provide a system for connecting a low-pressure jet to a transition duct in a gas turbine, which system is simple and safe to install.

Yet a further object of the invention is to provide a system for connecting a low-pressure jet to a transition duct in a gas turbine which is reliable, while bearing in mind the optimisation of the performance of the machine, and which is economically viable.

These and other objects are achieved by a system for connecting a low-pressure jet to a transition duct in a gas turbine, in which the said low-pressure jets are arranged in sectors of two or three stator blades and are fitted on to the ring of the low pressure jets, characterised in that the platforms of the said low-pressure jets have at least one channel inside which the transition duct is positioned by means of an edge and in that the centring between the said transition duct and the said ring of the low-pressure jets is directly achieved by centring devices operating at three or more points on the said ring of the low-pressure jets.

In a preferred embodiment of the invention, the centring means of the said transition duct consist of at least three keys which are forced between the said low-pressure jets and the said transition duct. The transition duct has three slits, with each of the slits corresponding to one of three slits belonging to three sectors of the low-pressure jets, the whole having dimensions such as to hold the three keys in position.

More particularly, the three keys can be placed at three staggered points at 120° each so as to ensure uniform support for the transition duct.

In another preferred embodiment of this invention, the said low-pressure jet sectors directly include the abovementioned keys in their platform.

In yet another preferred embodiment of the invention, the channel of the ring of the low-pressure jets is able to support the transition duct and give it the correct axial position.

In yet another preferred embodiment of the invention, the transition duct has the keys mounted or included in it and the low-pressure jet only has a slit for the respective key.

In yet another preferred embodiment of the invention, at least three points on the edge of the transition duct have a predetermined gap with respect to the channel for the low-pressure jet.

Furthermore, the predetermined gap is equal to the different thermal expansions which the transition duct undergoes with regard to the low-pressure jet, so that the gap is equal to zero when in a stationary position so as to allow the transition duct of the gas turbine to be centred with the channel while the edge forms the seal for the hot gases of the turbine.

Finally, the invention also comprises a low-pressure jet which forms part of a gas turbine and having sectors with two or three stator blades, characterised in that its platform has at least one channel inside which a transition duct is positioned by means of an edge, and in which centring between the said transition duct and the said ring of the low-pressure jets is directly achieved by centring means operating at three or more points on the said ring of the low-pressure jets.

Further features of the invention are described in the appended claims.

The further objects and advantages of the invention and its structural and functional features will become apparent from the description which follows and the appended drawings, which are provided by way of illustration and are not intended to limit the scope of the invention, and in which:

DETAILED DESCRIPTION OF THE INVENTION

Figure 1:
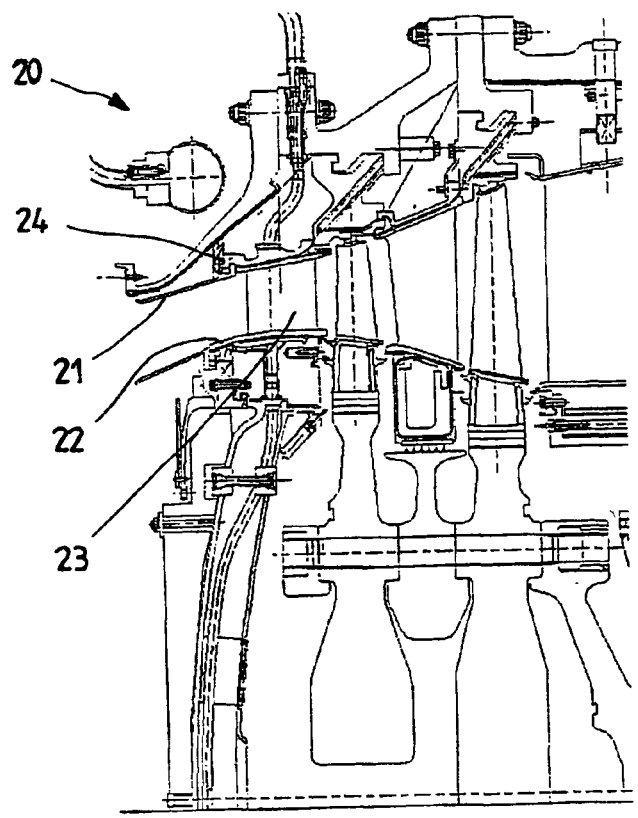
FIG. 1 shows a sectional view of a detail of a twin-shaft turbine, depicting a transition duct of the prior art.
Figure 2:
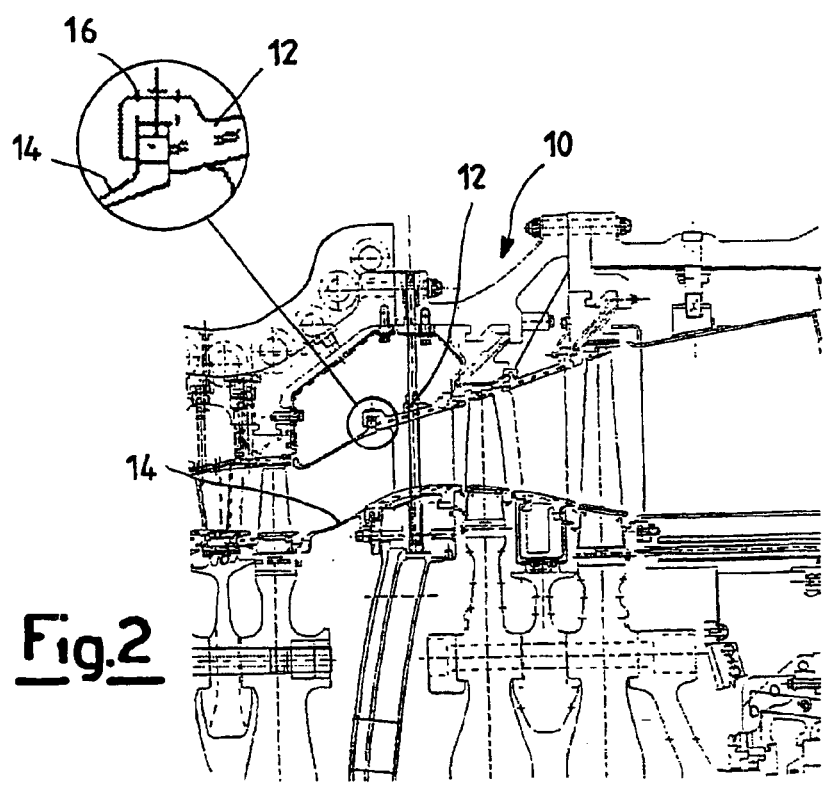
FIG. 2 shows a sectional view of a detail of a twin-shaft turbine, depicting the system for connecting a low-pressure jet to a transition duct according to the invention.
Figure 3:
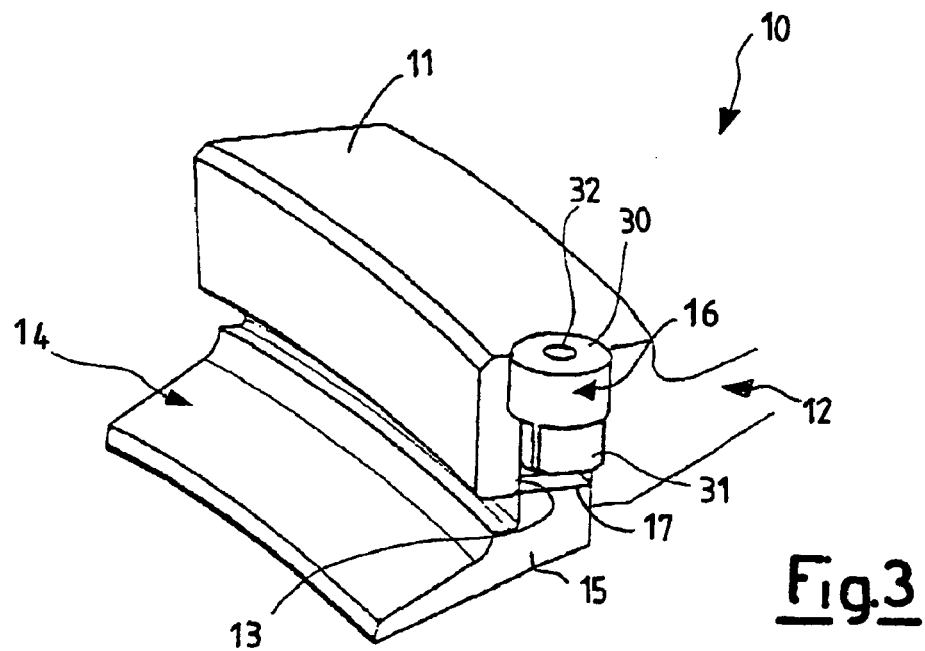
FIG. 3 shows a perspective view of the system for connecting a low-pressure jet to a transition duct according to the invention.
Figure 4:
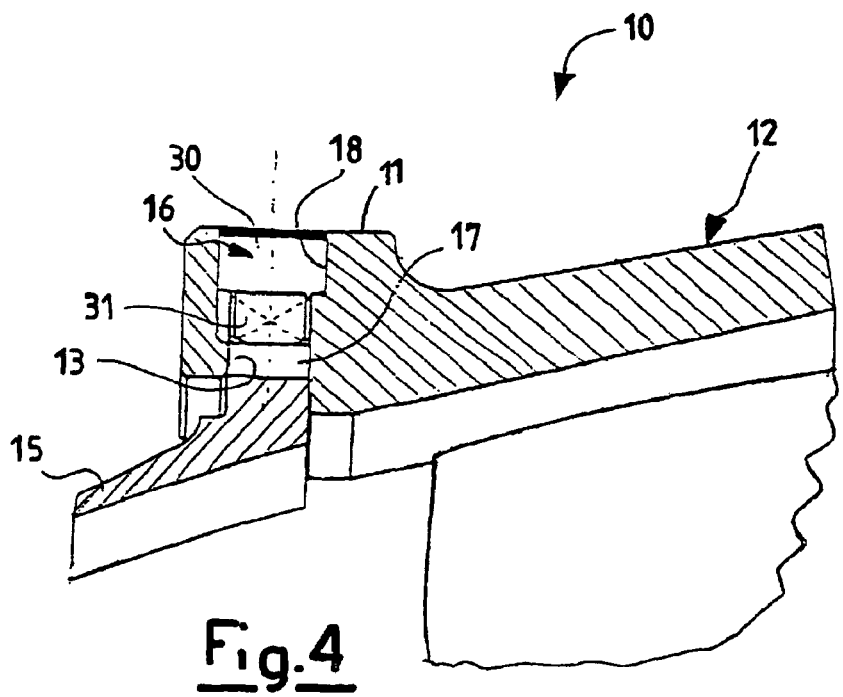
FIG. 4 shows a sectional view of the system for connecting a low-pressure jet to a transition duct according to the invention.

With particular reference to the figures mentioned, the system for connecting a low-pressure jet to a transition duct in a gas turbine according to the invention is indicated generally by the reference numeral 10.

In particular, the platforms 11 of the low-pressure jets 12 have a channel 13, inside which the transition duct 14 is positioned by means of an edge 15.

The jets 12 are arranged in sectors of two or three stator blades and are fitted on to the ring of the low-pressure jets.

Therefore, these can be easily fitted onto the edge 15 of the transition duct 14 so as to form the seal and the connection between these components.

Furthermore, the channel 13 of the low-pressure jets 12 supports the transition duct 14 and also gives the transition duct 14 its correct axial position.

A particularly important innovation is the system for centring the said transition duct 14 and the low-pressure jets 12.

As has been seen, in prior art gas turbines this centring was achieved by using the external housing of the gas turbine.

The improvement according to the present invention consists of the direct centring of the transition duct 14 to the low-pressure jets 12.

This provides the significant advantage of avoiding heat transfer to the external housing through the centring system.

The material of the external housing is not suitable for high temperatures and this new solution avoids oxidation, distortion or loss of sealing because of the high local temperature which would be created in the external housing.

The system of the invention is assembled by using at least three keys 16 among the low-temperature jets 12 and the transition duct 14.

Each key 16 has a cylindrical portion 30 with a central hole 32 and a square portion 31.

The transition duct 14 has three slits 17 and the three corresponding low-pressure jets sectors have another slit 18 or directly include the keys 16 in their platform 11.

The resulting system is always centred, as the transition duct 14 runs along the keys 16 and can only be coaxial with the ring of the low-pressure jets 12 and with the stage of the jets 12, thus avoiding the problems of the prior art referred to above.

More particularly, the three keys 16 are placed at three staggered points at 120° each so as to ensure uniform support for the transition duct 14.

Alternatively, the transition duct 14 may have the keys 16 fitted or included and the low-pressure jet 12 may only have the slit 18 for the respective key 16.

Another solution which has been envisaged consists of arranging at least three points on the edge 11 of the transition duct 14 which have a predetermined gap with the channel 13 of the low-pressure jet 12.

This predetermined gap is equal to the different thermal expansions which the transition duct 14 undergoes relative to the low-pressure jet 12 so that the gap is equal to zero in a stationary position.

This phenomenon obviously allows the transition duct 14 to be centred with the channel 13 whereas the edge 11 forms the seal for the hot gases of the turbine.

Finally, the components of the system for connecting a low-pressure jet to a transition duct in a gas turbine, according to the invention described above, have the following important structural and functional features.

Firstly, the transition duct 14 is a part at 360° to the thin walls; secondly, the transition duct 14 does not have struts or connecting arms; finally, the transition duct 14 is supported by platforms 11 connected to the low-pressure jets 12.

From the description given, the features of the inventive system for connecting a low-pressure jet to a transition duct which forms part of a gas turbine, which is the object of the invention, are obvious, as are the advantages thereof.

We wish to state here the following conclusive considerations and observations so as to specify the above advantages with greater precision and clarity.

A new solution to the problem referred to above has therefore been developed to be implemented on a new turbine.

The axial length of the transition duct has been reduced and new transition ducts and new connections to the low-pressure jets have been developed.

It is obvious that numerous variants may be introduced to the inventive system for connecting a low-pressure jet to a transition duct in a gas turbine, the object of the invention, without departing from the innovative principles contained in the idea illustrated.

It is obvious that this invention also comprises the relevant low-pressure jet described above with its connection system to the transition duct of the gas turbine.

It is finally obvious that in the practical use of this invention, the materials, shapes and dimensions of the details illustrated may be anything, depending on requirements, and they may be replaced or varied by other items which are equivalent from a technical point of view.

The scope of the invention is defined by the appended claims.

What is claimed is:

1. A system for connecting a ring including a platform and sectors of two or more stator blades forming low-pressure jets to a transition duct in a gas turbine, said platform having at least one channel, said transition duct having an edge inside said channel and means for centering the transition duct and the ring of the low-pressure jets relative to one another at three or more points on the ring of the low-pressure jets.

2. A connection system according to claim 1, characterised in that the centering means of the transition duct include at least three keys forced between the low-pressure jets and the transition duct.

3. A connection system according to claim 1, characterised in that the transition duct has three slits where each of the slits corresponds to one of three slits forming part of three sectors of low-pressure jets so as to hold the three keys in position.

4. A connection system according to claim 3, characterised in that the three keys are placed at three staggered points of 120° each so as to ensure uniform support for the transition duct.

5. A connection system according to claim 1, characterised in that the sectors of low-pressure jets directly include keys in said platform.

6. A connection system according to claim 1, characterised in that the channel of the ring of the low-pressure jets supports the transition duct in a predetermined axial position.

7. A connection system according to claim 1, characterised in that said transition duct has keys and said low-pressure jet have slits for receiving the respective keys.

8. A connection system according to claim 1, characterised in that at least three points of the edge of the transition duct have a predetermined gap with the channel of the low-pressure jet.

9. A connection system according to claim 8, characterised in that the predetermined gap is equal to the different thermal expansions which the transition duct undergoes with respect to the low pressure jets, so that the gap is equal to zero in a stationary position, enabling the transition duct to be centered with the channel while the edge forms the seal for the hot gases of the turbine.

10. A connection system according to claim 1, characterised in that the transition duct extends about 360° and has thin walls.

11. A connection system according to claim 1, characterised in that the transition duct is supported by platforms of the low-pressure jets.

12. A low-pressure jet forming part of a gas turbine with sectors of two or three stator blades, characterised in that the platform has at least one channel inside which a transition duct is positioned by means of an edge and centering means between the transition duct and the ring of the low-pressure jets is achieved directly by centering means operating at three or more points on the ring of the low-pressure jets.

* * * * *

UNITED STATES PATENT AND TRADEMARK OFFICE
CERTIFICATE OF CORRECTION

PATENT NO. : 6,893,209 B2 Page 1 of 1
APPLICATION NO. : 10/312842
DATED : May 17, 2005
INVENTOR(S) : Frosini et al.

It is certified that error appears in the above-identified patent and that said Letters Patent is hereby corrected as shown below:

Column 4, line 35, delete "jets sectors" and insert --jet sectors--

Column 4, line 49, delete "edge 11" and insert --edge 15--

Column 4, line 57, delete "edge 11" and insert --edge 15--

Line 3 of claim 7, delete "jet" and insert --jets--

Signed and Sealed this

Twenty-second Day of August, 2006

JON W. DUDAS
*Director of the United States Patent and Trademark Office*